(12) United States Patent
Kasperchik et al.

(10) Patent No.: US 11,639,448 B2
(45) Date of Patent: May 2, 2023

(54) WHITE INK

(71) Applicant: Hewlett-Packard Development Company, L.P., Fort Collins, CO (US)

(72) Inventors: Vladek Kasperchik, Corvallis, OR (US); Phillip C. Cagle, San Diego, CA (US); David Michael Ingle, San Diego, CA (US); Paul Joseph Bruinsma, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 820 days.

(21) Appl. No.: 15/119,230

(22) PCT Filed: Mar. 20, 2014

(86) PCT No.: PCT/US2014/031301
§ 371 (c)(1),
(2) Date: Aug. 16, 2016

(87) PCT Pub. No.: WO2015/142335
PCT Pub. Date: Sep. 24, 2015

(65) Prior Publication Data
US 2017/0051169 A1  Feb. 23, 2017

(51) Int. Cl.
*C09D 11/322* (2014.01)
*B41M 7/00* (2006.01)
(Continued)

(52) U.S. Cl.
CPC ............... *C09D 11/322* (2013.01); *B41J 2/01* (2013.01); *B41M 5/0023* (2013.01);
(Continued)

(58) Field of Classification Search
CPC ....... C09D 11/30; C09D 11/10; C09D 11/322; B41J 2/01; B41J 11/002; B41M 3/00; B41M 5/0023; B41M 7/009
See application file for complete search history.

(56) References Cited

U.S. PATENT DOCUMENTS

| 4,269,891 A | 5/1981 | Minagawa |
| 6,765,040 B2 | 7/2004 | Krishnan et al. |

(Continued)

FOREIGN PATENT DOCUMENTS

| AU | 2007240216 | 7/2008 |
| CN | 102395633 | 3/2012 |

(Continued)

OTHER PUBLICATIONS

Science Direct-PTFE Tg (obtained Jun. 24, 2017).*
(Continued)

*Primary Examiner* — Christopher M Polley
*Assistant Examiner* — Sathavaram I Reddy
(74) *Attorney, Agent, or Firm* — HP Inc. Patent Department

(57) ABSTRACT

The present disclosure provides a white ink comprising an aqueous ink vehicle, a white colorant, and latex particles. The colorant can consist essentially of metal oxide particles present at from 2 wt % to 50 wt %, can have an average particle size from 100 nm to 1000 nm, and can have a high refractive index from 1.8 to 2.8. The latex can be present in the ink at from 2 wt % to 20 wt %, can have a glass transition temperature from 0° C. to 130° C., and can have a low refractive index from 1.3 to 1.6. The metal oxide particles and latex particles can be present in the white ink at weight ratio is from 6:1 to 1:3.

20 Claims, 2 Drawing Sheets

(51) Int. Cl.
- *C09D 11/10* (2014.01)
- *B41J 2/01* (2006.01)
- *B41M 5/00* (2006.01)
- *B41M 3/00* (2006.01)

(52) U.S. Cl.
CPC ............ *B41M 7/009* (2013.01); *C09D 11/10* (2013.01); *B41M 3/00* (2013.01)

(56) References Cited

U.S. PATENT DOCUMENTS

| | | | |
|---|---|---|---|
| 7,279,511 B2 | 10/2007 | Zhu et al. | |
| 7,858,676 B2 | 12/2010 | Waki et al. | |
| 8,440,744 B2 | 5/2013 | Sugita et al. | |
| 8,556,405 B2 | 10/2013 | Habashi et al. | |
| 2004/0032473 A1* | 2/2004 | Ishimoto | B41J 2/2114 347/100 |
| 2004/0249018 A1* | 12/2004 | Kataoka | C09D 11/30 523/160 |
| 2006/0083872 A1 | 4/2006 | Sen et al. | |
| 2010/0302300 A1 | 12/2010 | Verdonck | |
| 2011/0184108 A1* | 7/2011 | Okuda | C09D 11/10 524/377 |
| 2012/0149831 A1 | 6/2012 | Nagahama et al. | |
| 2013/0225748 A1 | 8/2013 | Jakubek et al. | |
| 2013/0284050 A1 | 10/2013 | Adamic et al. | |
| 2014/0078217 A1 | 3/2014 | Ingle et al. | |

FOREIGN PATENT DOCUMENTS

| | | | |
|---|---|---|---|
| CN | 103124775 | 5/2013 | |
| CN | 103773108 | 5/2014 | |
| EP | 1388578 | 2/2004 | |
| EP | 2243807 | 10/2010 | |
| GB | 916245 | 1/1963 | |
| JP | S58122974 | 7/1983 | |
| JP | 2002225421 | 8/2002 | |
| JP | 2004181715 | 7/2004 | |
| JP | 2012025884 | 2/2012 | |
| JP | 2012025885 | 2/2012 | |
| JP | 2013082885 | 5/2013 | |
| WO | 2007035505 | 3/2007 | |
| WO | WO 2012054052 A1 * | 4/2012 | ............ B82Y 30/00 |
| WO | WO 2012170032 A1 * | 12/2012 | ........... C09D 11/322 |
| WO | 2014193387 | 12/2014 | |

OTHER PUBLICATIONS

Styrene MSDS by Panachem (Obtained Jan. 5, 2018).*
Refractive Index of Titanium Dioxide by Filmetrics (obtained Jan. 5, 2018).*
Refractive Index of Acrylic, Acrylate, Lucite, Perspex and Plexiglass. Filmetrics. (Year: 2018).*
International Search Report dated Dec. 19, 2014 for PCT/US2014/031301, Applicant Hewlett-Packard Development Company, L.P.
J. Polymers, pp. 650-655, vol. 17, No. 196, 1968, Partial English translation of Table 1 of document R3, Third Party Observations against EP 14 886 093.5.
English translation of JP2013082885A provided by JPO, Document R1, Third Party Observations against EP 14 886 093.5.
Optical plastic materials, J. Optics, pp. 69-75, vol. 24(2), 1995, Partial English translation of Table 1 of document R2, Third Party Observations against EP 14 886 093.5.

* cited by examiner

WHITE INK

BACKGROUND

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs much lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium. Inks normally used in ink-jet recording are commonly composed of water-soluble organic solvents (humectants, etc.), surfactants, and colorants in a predominantly aqueous fluid. Regarding the use of colorants, certain pigments can be more challenging than other in achieving certain desirable properties. For example, ink opacity and durability can be a challenge in certain circumstances.

BRIEF DESCRIPTION OF THE DRAWINGS

Additional features and advantages of the disclosure will be apparent from the detailed description which follows, taken in conjunction with the accompanying drawings, which together illustrate, by way of example, features of the technology; and, wherein.

Figure 1:
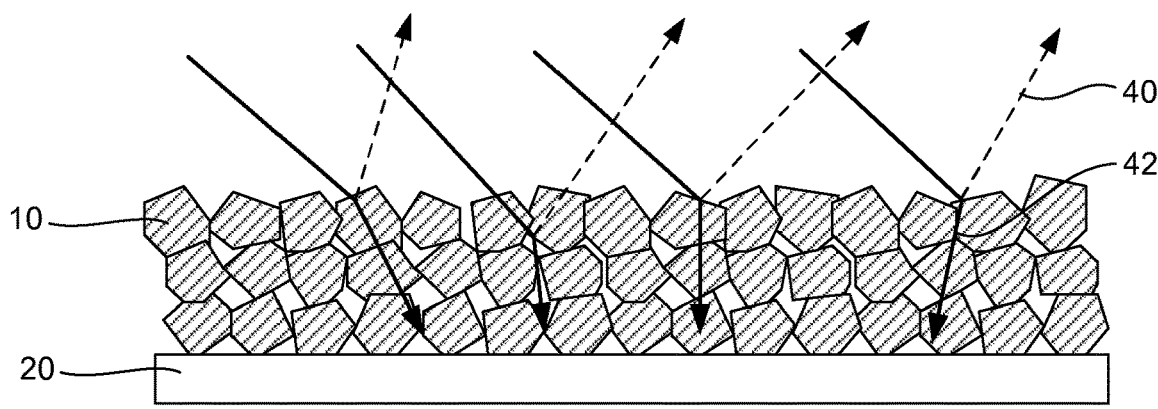
FIG. 1 is schematic cross-sectional view of a printed article with tightly packed metal oxide-based ink printed on a media sheet.

Reference will now be made to the exemplary embodiments illustrated, and specific language will be used herein to describe the same. It will nevertheless be understood that no limitation of the scope of the disclosure is thereby intended.

DETAILED DESCRIPTION

The present disclosure is drawn particularly to white inks, which can be particularly useful when formulated as thermal or other ink jet inks. These inks can exhibit enhanced opacity as well as durability in some examples. In accordance with this, the present disclosure is drawn to a white ink, comprising an aqueous ink vehicle, white colorant consisting essentially of metal oxide particles (e.g., zinc oxide; titanium dioxide such as rutile or anatase; zirconium oxide; etc.), and latex particles. The metal oxide particles can be present in the ink at from 2 wt % to 50 wt %, and can have an average particle size from 100 nm to 1000 nm. The metal oxide particles can be colorless and water insoluble. The latex particles can be present in the ink at from 2 wt % to 20 wt % and can have a glass transition temperature from 0° C. to 130° C. In this example, the metal oxide particles to latex particles weight ratio can be from 6:1 to 1:3. In certain specific examples, by selecting metal oxide particles with a high refractive index (e.g. from 1.8 to 2.8), and latex particles with a relatively lower refractive index (e.g., from 1.3 to 1.6), the opacity of the ink when printed on a media sheet can further be unexpectedly increased compared to an ink without the added latex particles (even when the latex is replaced with an equivalent concentration of metal oxide particles).

In further detail, in providing some optical spacing between metal oxide particles by interposing latex particles there between, opacity can be increased compared to inks without the latex particles present. In other words, a layer of more densely packed high refractive index metal oxide particles can actually be less opaque (to light) than a layer of less densely packed metal oxide particles (e.g., pigment crowding effect). It may be considered counterintuitive because one expects better light scattering capability and opacity of coating having a higher concentration of high refractive index metal oxide particles. Thus, in certain examples, by decreasing the density of the metal oxide particles or pigment content, and replacing the pigment with essentially colorless latex particles, such as fusible latex particles, opacity could actually be increased.

As mentioned, the particle size of the metal oxide particles can be from 100 nm to 1000 nm, but in other examples, the particle size can be from 150 nm to 700 nm, from 170 nm to 400 nm, or from 180 nm to 300 nm. These larger sized particles are considered to be efficient particle sizes for light scattering when spaced appropriately by the latex particles. The more efficient the light scattering, typically, the more opaque the printed ink layer may be (assuming appropriate spacing in the pigmented layer as described herein). Thus, the white inks of the present disclosure can be formulated such that when printed, the latex particles provide an average space between metal oxide particles ranging from 20 nm to 2000 nm, in one example. In other examples, the average space between metal oxide particles (as provided primarily by the latex particles) can be 50 nm to 500 nm, from 150 to 300, or in one specific example, about 200 nm.

In further detail, optical spacing can be experimentally determined by printing the ink on a media substrate, fusing the ink by applying heat at a temperature about 2° C. to 110° C. above the minimum film formation temperature of the latex particles, and evaluating using Transition Electron Microscopy (TEM) cross-section photo of a printed white ink layer after drying. If the opacity provided by the white ink is not high enough, the ratio of metal oxide particles to latex particles can be adjusted up or down, as effective, or the thickness of the ink can be increased. That being stated, an advantage of the white inks of the present disclosure is that in some instances, thickness does not need to be increased to increase opacity. For example, by appropriately spacing the metal oxide particles with the latex particles, opacity can be boosted from 0.1% to 25%, and more typically, from 5% to 25%.

Figure 2:
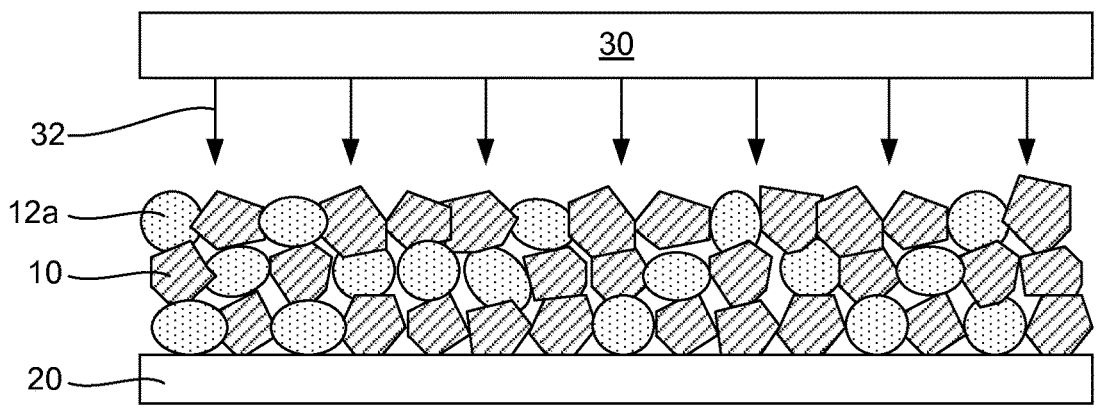
FIG. 2 is a schematic cross-sectional view of a printed article with metal oxide-based ink which includes latex particles providing optical spacing between the metal oxide particles in accordance with examples of the present disclosure.
Figure 3:
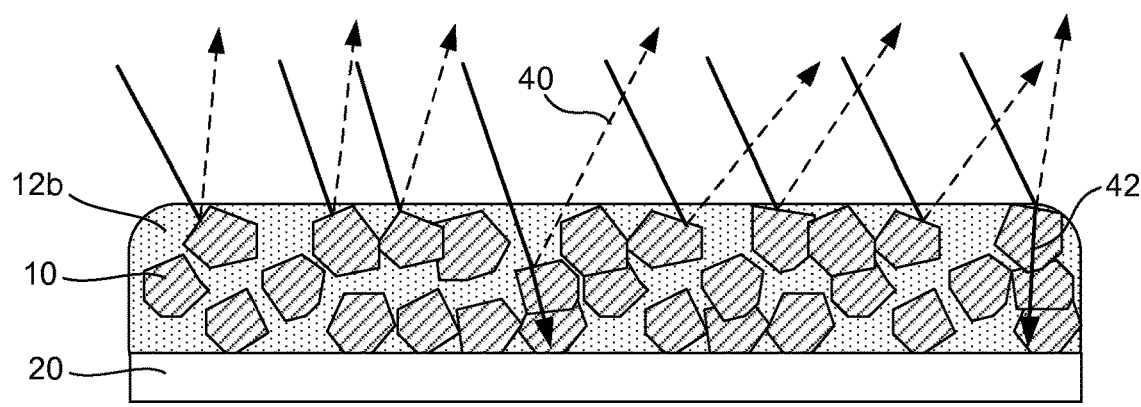
FIG. 3 is a schematic cross-sectional view of the printed article of FIG. 2 after it has been heat fused in accordance with examples of the present disclosure.

FIGS. 1-3 show schematic representations of cross-sectional views of (i) a printed article of tightly packed metal oxide particles 10 applied to a media sheet 20 (FIG. 1), (ii) a printed article of less densely packed metal oxide particles 10 applied to a media sheet 20 where the spacing is provided by latex particles 12*a* (FIG. 2), and (iii) a printed article such as that shown in FIG. 2 after the latex particles 12b have been heat fused (FIG. 3). Also shown in FIG. 2 is a heat fusing device 30 which is used to apply heat 32 to the printed article. For each of these printed articles, photographs for verification of actual optical spacing (or lack thereof) for each specific ink formulation can be generated using TEM. As shown in FIG. 1, there is some light scattering 40, as well as some light transmittance 42 present. Conversely, shown schematically in FIG. 3, there may be more light scattering, but there is less transmittance, which means there is more opacity. This increased opacity can be achieved by optically spacing the metal oxide particles from one another. For example, drying of the inks without latex particles such that all of the high refractive index particles are in close contact (as in FIG. 1) leads to formation of a densely packed layer of the metal oxide particles, which reduces their light scattering ability and overall opacity. On the other hand, using the fusible latex particles as shown in FIG. 2, and typically applying heat to fuse the latex particles as shown in FIG. 3, the low refractive index optical spacing can boost the opacity of the printed coating by from 0.1% to 25%, or more typically from 5% to 20% or from 5% to 25%. In other words, the crowding effect of tightly-packed high refractive index (n) particles with little or no voids decreases light scattering and increase transparency of the coating. By optically spacing the metal oxide particles with the low refractive index latex particles (and typically heat fused after printing) an increase in opacity can be realized. As a further point, though light scattering is not specifically shown in FIG. 2, there will be light scattering prior to fusing of the latex that can be similar to that shown in FIG. 3. That being said, fusion can add enhanced durability to the printed article. In some cases the fusing of the latex particles may help the latex polymer distribute more evenly between light scattering metal oxide particles and, hence, further improve opacity as well.

In accordance with this, a printed article can comprise up to 50 gsm of a fused image applied to a media substrate. The term "up to" 50 gsm" is used because typical inkjet images include fully imaged areas as well as non-imaged and/or lower density areas. In one example, full density inked area may be at from 30 to 50 gsm dried ink film, but densities lower in the tone ramp will be lower than this, thus the phrase "up to" 50 gsm. That being stated, though some areas on a media substrate might be at 0 gsm under this definition (unprinted areas), there will be areas that are imaged that range from greater than 0 gsm up to 50 gsm. In a typical printed article, there is a portion of the media that can be printed at from 5 gsm to 50 gsm.

In further detail, the fused image can include metal oxide particles having an average particle size from 100 nm to 1000 nm and a high refractive index from 1.8 to 2.8. The metal oxide particles can be optically spaced at an average of from 20 nm to 2000 nm by a fused latex film having a low refractive index from 1.3 to 1.6 and a glass transition temperature from 0° C. to 130° C., and in one example, from 40° C. to 130° C. In further detail, the fused image can have a normalized opacity from 45% to 95%, from 60% to 95%, or from 75% to 95%.

In addition to assisting with enhanced opacity, as briefly mentioned, the latex particles can also provide enhanced durability. More specifically, the use of latex particles, including fusible latex particles that are thermally or otherwise cured after printing on the media substrate, can provide added durability to the printed image. Thus, the latex can provide the dual role of enhancing opacity by appropriately spacing the metal oxide particles, and can also provide durability on the printed media sheet. This is particularly the case in examples where there may be high metal oxide particle loads that are dispersed by appropriate dispersing agents. Films formed by hard ceramic particles (such as high refractive index metal oxides on surface of low porosity and non-porous media substrates tend to have very poor mechanical properties. The film-forming behavior of latex particles described herein can bind the relatively large metal oxide particles (with dispersing agent present in the ink) into continuous coating that can be very durable. Additionally, as mentioned, the low refractive index of the polymer film creates low refractive index or "n" domains, i.e. optical spacers between high n metal oxide particles, thereby simultaneously enhancing opacity of the print.

Coalescence of latex particles into continuous phase creates low refractive index domains in the coating. The refractive index of the fused latex in the coating may range from 1.3 to 1.6, and in one example, can be from 1.4 to 1.6, or 1.4 to 1.5. The metal oxide particles can have a refractive index ranging from 1.8 to 2.8, or from 2.2 to 2.8. Specific examples include zinc oxide (about 2.4), titanium dioxide (about 2.5 to 2.7), zirconium oxide (about 2.4), etc. Typically, the difference in the refractive indexes can be from about 0.2 to 1.5, or more, if possible (typically, the higher is the better), though this is not required as long as there is enough of a difference that the opacity can be increased at least to some degree by the optical spacing and the refractive index difference.

Conditions enabling usage of the polymer latex in the white ink formulations of the present disclosure are dependent on what type of ink is being prepared. For example, for thermal inkjet printing applications, the glass transition temperature of the latex particles may range from 0° C. to 130° C., or from 40° C. to 130° C. in some examples.

The monomers used in the latexes can be vinyl monomers. In one example, the monomers can be one or more of vinyl monomers (such as vinyl chloride, vinylidene chloride, etc.), vinyl ester monomers, acrylate monomers, methacrylate monomers, styrene monomers, ethylene, maleate esters, fumarate esters, and itaconate esters combinations thereof, or mixtures thereof. In one aspect, the monomers can include acrylates, methacrylates, styrenes, or mixtures thereof. The monomers can likewise include hydrophilic monomers including acid monomers, and hydrophobic monomers. Furthermore, monomers that can be polymerized in forming the latexes include, without limitation, styrene, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethyl hexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinyl-caprolactam, combinations thereof, derivatives thereof, or mixtures thereof.

Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof.

Regarding the latex particulates, the latexes can have various shapes, sizes, and molecular weights. In one example, the latex particulates may have a weight average molecular weight ($M_w$) of about 5,000 to about 500,000. In one aspect, the latex particulates can have a weight average molecular weight ($M_w$) ranging from about 100,000 to about 500,000. In some other examples, the latex resin has a weight average molecular weight of about 150,000 to 300,000.

Further, the average particle diameter of the latex particles can be from about 10 nm to about 1 μm; in some other examples, from about 10 nm to about 500 nm; and, in yet other examples, from about 50 nm to about 300 nm. The particle size distribution of the latex is not particularly limited, and either latex having a broad particle size distribution or latex having a mono-dispersed particle size distribution may be used. It is also possible to use two or more kinds of latex particles each having a mono-dispersed particle size distribution in combination.

The white inks described herein can be formulated in any form where a more opaque white ink may be desired. However, these inks are very useful for thermal inkjet printhead application. In one example, a reactive hydrophilic alkoxysilane dispersant can be used to assist in particle dispersion and jettability. In some specific examples, inkjet printing of white coatings or patterns with adequate opacity (>50-60%) can benefit from a relatively high pigment load (e.g. metal oxide particles above 2 wt %, above 5 wt %, above 8 wt %, etc.) and the latex described herein. Jetting of high pigment load inks becomes challenging even for piezo printheads. However, with the use of an appropriate dispersant, such as the reactive hydrophilic alkoxysilane dispersants described herein, more reliable performance of higher metal oxide particle loads printed from thermal inkjet printheads with low nominal drop weight (as low as 10 ng, or even as low as 5 ng) can be realized.

In further detail regarding the reactive hydrophilic alkoxysilane dispersants that can be used, examples include, but are not limited to, hydrolysable alkoxysilanes with alkoxy group attached to water-soluble (hydrophilic) moieties, such as water-soluble polyether oligomer chains, phosphate groups, or carboxylic groups. In some examples, the dispersant used to disperse metal oxide particles can be a polyether alkoxysilane or polyether phosphate dispersant. Upon dissolution in water with the metal oxide particles, the alkoxysilane group of the dispersant often hydrolysis resulting in formation of silanol group. The silanol group, in turn, may react or form hydrogen bonds with hydroxyl groups of metal oxide particle surface, as well as with silanol groups of other dispersant molecules through hydrogen bonding. These reactions lead to bonding or preferential absorption of the dispersant molecules to the metal oxide particle surfaces and also form bonds between dispersant molecules themselves. As a result, these interactions can form thick hydrophilic coatings of reactive dispersant molecules on surface of the metal oxide particles. This coating can increase the hydrodynamic radius of the particles and thus reduce their effective density and settling rate. Furthermore, the dispersant coating prevents agglomeration of the metal oxide particles upon settling so that when sediment and settling does occur over time in the ink formulations, the settled metal oxide particles remain fluffy and thus are easy to re-disperse upon agitation. In still further detail, these dispersants have a relatively short chain length and do not contribute significantly to the ink viscosity, even with relatively high metal oxide particle loads, e.g. over 30 wt % metal oxide particles in the ink.

As mentioned, a suitable alkoxysilane dispersant can have an alkoxysilane group which can be easily hydrolyzed in aqueous environment and produce a silanol group, and a hydrophilic segment. The general structure of the alkoxysilane group is —Si(OR)$_3$, where R most can be methyl, ethyl, n-propyl, isopropyl, or even a longer (branched or unbranched) alkane chain. It is noted that the longer the hydrocarbon (R), the slower hydrolysis rate and rate of interaction with dispersed metal oxide particle surface. In a few highly practical examples, structures with —Si(OR)$_3$ where R is methyl or ethyl can typically be used. The hydrophilic segment of the alkoxysilane dispersant can likewise be large enough (relative to the whole molecule size) in order to enable dispersant solubility in aqueous environment, as well as prevent agglomeration of the metal oxide particles. In one example, the hydrophilic segment can be a polyether chain, e.g., polyethylene glycol (PEG) or its co-polymer with polypropylene glycol (PPG). Polyether-based dispersant moieties have clean thermal decomposition, and thus, are good candidates for use. When heated above decomposition temperature, PEG and PPG-based molecules decompose into smaller molecular fragments with high volatility or good water solubility. Thus, their decomposition usually does not form noticeable amounts of solid residue on surface of microscopic heaters used for driving thermal inkjet printheads (which can cause thermal inkjet printheads to fail over time or render them non-operational in some instances).

In further detail, examples polyether alkoxysilane dispersants that may be used to disperse metal oxide particles can be represented by the following general Formula (I):

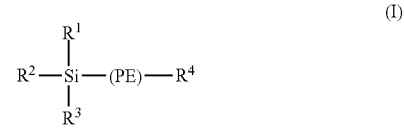

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —OCH$_3$ and —OCH$_2$CH$_3$. In some examples, $R^1$, $R^2$ and $R^3$ are linear alkoxy groups having from 1 to 5 carbon atoms. In some other examples, $R^1$, $R^2$ and $R^3$ groups are —OCH$_3$ or —OC$_2$H$_5$.

b) PE is a polyether oligomer chain segment of the structural formula [CH$_2$)$_n$—CH(R)—O]$_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—$CH(CH_3)$—O—), or a mixture of both types. In some examples, the polyether chain segment (PE) contains PEG units (—$CH_2CH_2$—O—); and c) $R^4$ is hydrogen, or a linear or a branched alkyl group. In some examples, $R^4$ is an alkyl group having from 1 to 5 carbon atoms.

Other examples of dispersants used to disperse metal oxide particles can include polyether alkoxysilane dispersants having the following general Formula (II):

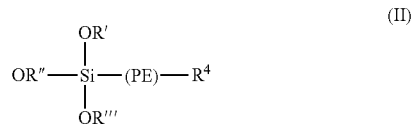

wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[CH_2)_n$—CH—R—O$]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the metal oxide particles present in the ink composition are dispersed with polyether alkoxysilanes. Examples of suitable polyether alkoxysilanes include $(CH_3O)_3Si$—$(CH_2CH_2O)_{n'}$ H; $(CH_3CH_2O)_3Si$—$(CH_2CH_2O)_{n'}$ H; $(CH_3O)_3Si$—$(CH_2CH_2O)_{n'}$ $CH_3$; $(CH_3CH_2O)_3Si$—$(CH_2CH_2O)_{n'}$ $CH_3$; $(CH_3O)_3Si$—$(CH_2CH_2O)_{n'}$ $CH_2CH_3$; $(CH_3CH_2O)_3Si$—$(CH_2CH_2O)_{n'}$ $CH_2CH_3$; $(CH_3O)_3Si$—$(CH_2CH(CH_3) O)_{n'}$ H; $(CH_3CH_2O)_3Si$—$(CH_2CH(CH_3) O)_{n'}$ H; $(CH_3O)_3Si$—$(CH_2CH(CH_3) O)_{n'}$ $CH_3$; $(CH_3CH_2O)_3Si$—$(CH_2CH(CH_3) O)_{n'}$ $CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, Silques®A-1230 manufactured by Momentive Performance Materials and Dynasylan® 4144 manufactured by Evonik/Degussa.

The amount of dispersant used in the metal oxide dispersion may vary from about 1% by weight to about 300% by weight of the metal oxide particles content. In some examples, the dispersant content range is from about 2 to about 150% by weight of the metal oxide particles content. In some other examples, the dispersant content range is from about 5 to about 100% by weight of the metal oxide particles content.

A dispersion of metal oxide particles suitable for forming the white inks of the present disclosure can be prepared via milling or dispersing metal oxide powder in water in the presence of suitable dispersants. For example, the metal oxide dispersion may be prepared by milling commercially available inorganic oxide pigment having large particle size (in the micron range) in the presence of the dispersants described above until the desired particle size is achieved. The starting dispersion to be milled can be an aqueous dispersion with solid content up to 40% by weight of the metal oxide particles or pigments. The milling equipment that can be used may be a bead mill, which is a wet grinding machine capable of using very fine beads having diameters of less than 1.0 mm (and, generally, less than 0.3 mm) as the grinding medium, for example, Ultra-Apex Bead Mills from Kotobuki Industries Co. Ltd. The milling duration, rotor speed, and/or temperature may be adjusted to achieve the dispersion particle size desired.

The white inks of the present disclosure also include an aqueous ink vehicle. As used herein, "ink vehicle" refers to the liquid fluid in which the metal oxide particles and the latex particulate are dispersed to form an ink. Ink vehicles are known in the art, and a wide variety of ink vehicles may be used with the systems and methods of the present technology. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry other solid additives as well, such as polymers, UV curable materials, plasticizers, etc. Additionally, the term "aqueous ink vehicle" refers to a liquid vehicle including water as a solvent. In one aspect, water can comprise a majority of the liquid vehicle.

Typical ink vehicle formulations described herein can include water, and can further include co-solvents present in total at from 0.1 wt % to 30 wt %, depending on the jetting architecture, though amounts outside of this range can also be used. Further, non-ionic, cationic, and/or anionic surfactants can be present, ranging from 0.01 wt % to 10 wt %. In addition to the metal oxide particle colorant, the balance of the formulation can be purified water, or other vehicle components known in the art, such as biocides, viscosity modifiers, materials for pH adjustment, sequestering agents, preservatives, and the like. Typically, the ink vehicle can include water as one of a major solvent and can be referred to as an aqueous liquid vehicle.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R. T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives known to those skilled in the art to modify properties of the ink as desired. Such additives can be present at from 0.01 wt % to 20 wt %.

Figure 4:
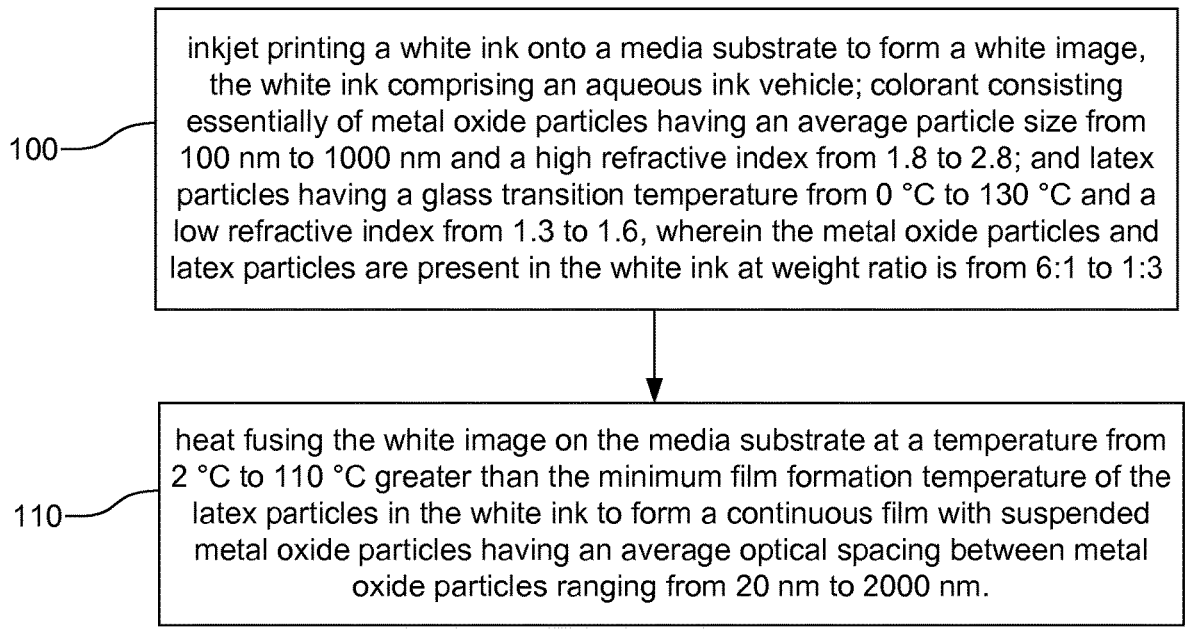
FIG. 4 is a flow chart depicting a method of printing in accordance with examples of the present disclosure.

In another example, as set forth in FIG. 4, a method of forming a white image can comprise inkjet printing 100 a white ink onto a media substrate to form a white image, and heat fusing 110 the white image on the media substrate. The white ink can comprise an aqueous ink vehicle; metal oxide particles having an average particle size from 100 nm to 1000 nm and a high refractive index from 1.8 to 2.8; and latex particles having a glass transition temperature from 0° C. to 130° C. and a low refractive index from 1.3 to 1.6. In one example, the metal oxide particles to latex particles are present in the white ink at weight ratio is from 6:1 to 1:3. The step of heat fusing can include applying heat at a temperature from 2° C. to 110° C. greater than the minimum film formation temperature of the latex particles to form a continuous film with suspended metal oxide particles having an average optical spacing be between metal oxide particles ranging from 20 nm to 2000 nm.

As used herein, the "minimum film formation" temperature is the actual temperature that latex will coalesce. This temperature can be substantially lower than the glass transition temperature of the latex, particularly in the presence of plasticizing solvents. For instance, a latex with a Tg of 105° C. can be made to coalesce into a film at 60° C. with the right type and amount of coalescing solvent. An example of this phenomenon is a latex comprising polymerized monomers of methyl methacrylate and styrene in an ink with the solvent 2-pyrrolidinone, which effectively can lower the coalescence temperature for this type of latex particle. Thus, the minimum film formation temperature is to be determined when present in ink formulation, as it can be impacted by other ink formulation ingredients.

It is noted that when discussing the present inks, printed articles, and/or methods, each of these discussions can be considered applicable to each of these embodiments, whether or not they are explicitly discussed in the context of that embodiment. Thus, for example, in discussing refractive index related to a composition or the opacity in the context of the printed article, such elements are also relevant to and directly supported in the context of the methods described herein, and vice versa.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, it is understood that any reference to open ended transition phrases such "comprising" or "including" directly supports the use of other know, less open ended, transition phrases such as "consisting of" or "consisting essentially of" and vice versa.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following illustrates some examples of the disclosed inks, printed articles, and methods that are presently known. However, it is to be understood that the following are only exemplary or illustrative of the application of the principles of the present disclosure. Numerous modifications and alternative examples may be devised by those skilled in the art without departing from the spirit and scope of the present compositions and methods. Thus, while the present inks and methods have been described above with particularity, the following examples provide further detail in connection with what are presently deemed to be the acceptable embodiments.

Example 1

Metal Oxide Particle Dispersion 1

A metal oxide particle dispersion suitable for formulating into a thermal inkjet ink and having high light scattering properties was prepared by milling "R-900" grade $TiO_2$ pigment (available from "E.I. du Pont de Nemours and Co.", Wilmington, Del.) with polyether alkoxysilane dispersant "Silquest A-1230 (available from "Momentive Performance Materials", Albany, N.Y.). The milling was carried out in "MiniCer" bead mill (available from NETZSCH Premier Technologies, LLC.," Exton, Pa.) utilizing YTZ milling beads with a 0.3 mm diameter. The water-based dispersion produced contained about 50 wt % of $TiO_2$ with a A-1230 dispersant level of 10 wt % of the $TiO_2$ mass. Mean particle size of $TiO_2$ in the dispersion was about 220 nm, as determined by NANOTRAC® particle size analyzer (Microtrac Corp., Montgomeryville, Pa.).

Example 2

Metal Oxide Dispersion 2

A metal oxide particle dispersion suitable for formulating into a thermal inkjet ink and having high light scattering properties was prepared by milling "R-930" grade TiO$_2$ pigment (available from "E.I. du Pont de Nemours and Co.", Wilmington, Del.) with polyether alkoxysilane dispersant "Silquest A-1230 (available from "Momentive Performance Materials", Albany, N.Y.). The milling was carried out in "MiniCer" bead mill (available from NETZSCH Premier Technologies, LLC.," Exton, Pa.) utilizing YTZ milling beads with a 0.3 mm diameter. The water-based dispersion produced contained about 50 wt % of TiO$_2$ with a A-1230 dispersant level of 15 wt % of the TiO$_2$ mass. Mean particle size of TiO$_2$ in the dispersion was about 240 nm, as determined by NANOTRAC® particle size analyzer (Microtrac Corp., Montgomeryville, Pa.).

Example 3

Metal Oxide Dispersion 3

A metal oxide particle dispersion suitable for formulating into a thermal inkjet ink and having high light scattering properties was prepared by milling "R-930" grade TiO$_2$ pigment (available from "E.I. du Pont de Nemours and Co.", Wilmington, Del.) with polyether alkoxysilane dispersant "Dynasylan® 4144" manufactured by "Evonik Industries" (former "Degussa" located in Germany). The milling was carried out in "MiniCer" bead mill (available from NETZSCH Premier Technologies, LLC.," Exton, Pa.) utilizing YTZ milling beads with a 0.3 mm diameter. The water-based dispersion produced contained about 50 wt % of TiO$_2$ with a A-1230 dispersant level of 12 wt % of the TiO$_2$ mass. Mean particle size of TiO$_2$ in the dispersion was about 240 nm, as determined by NANOTRAC® particle size analyzer (Microtrac Corp., Montgomeryville, Pa.).

Example 4

Latex Dispersion 1

Water (116 g) is heated to 77° C. with mechanical agitation. At 77° C., 0.30 g, potassium persulfate is added. To this mixture is added over 180 minutes an aqueous emulsion comprised of water (28.2 g), copolymerizable surfactant selected from Hitenol BC-10, BC-30, KH-05 or KH-10 (1.5 g), methyl methacrylate (91.1 g), styrene (24.1 g) and butyl acrylate (4.8 g), and methacrylic acid (0.6 g). Residual monomer is reduced by typical methodology using ascorbic acid and t-butyl hydroperoxide. After cooling the near ambient temperature, pH is adjusted to ~8 with dilute potassium hydroxide; inkjet suitable aqueous biocides are added. The resulting acrylic latex is 41% solids; particle size 0.22µ; viscosity <50 cps.

Example 5

Latex Dispersion 2

Water (169 g) and 6.5 g of latex seed (50% solids; particle size 60 to 70 nm) are heated to 77° C. with mechanical agitation. At 77° C., 0.37 g potassium persulfate is added. To this mixture is added over 72 minutes an aqueous emulsion comprised of water (13.7 g), copolymerizable surfactant selected from Hitenol BC-10, BC-30, KH-05 or KH-10 (0.70 g), styrene (17.7 g) and butyl acrylate (37.5 g). When the first polymerization is completed reacting, a second emulsion comprised of water (34.9 g), copolymerizable surfactant selected from Hitenol BC-10, BC-30, KH-05 or KH-10 (1.6 g), trimethylcyclohexyl methacrylate (21.1 g), methyl methacrylate (99.0 g), butyl acrylate (6.1 g) and methacrylic acid (2.6 g) is added over 168 minutes. Residual monomer is reduced by typical methodology using ascorbic acid and t-butyl hydroperoxide. After cooling the near ambient temperature, pH is adjusted to ~8 with dilute potassium hydroxide; inkjet suitable aqueous biocides are added. The two monomer compositions' refractive indices are 1.5±0.2. The resulting acrylic latex is 41% solids; particle size 0.23µ; and viscosity <50 cps.

Example 6

Metal Oxide Ink Formulation (Control Ink)

A thermal inkjet ink formulation with titanium dioxide, but no latex particles, was prepared for comparison purposes. The formulation is set forth in Table 1, below:

TABLE 1

| Components | Actives | Target | Formulation |
|---|---|---|---|
| 2-methyl-1,3-propanediol | 100.00 wt % | 5.00 wt % | 5.00 wt % |
| 2-Pyrrolidinone | 100.00 wt % | 16.00 wt % | 16.00 wt % |
| Nonionic Surfactant 1 | 90.00 wt % | 0.50 wt % | 0.56 wt % |
| Nonionic Surfactant 2 | 25.30 wt % | 0.50 wt % | 1.98 wt % |
| Crodafos N-3 Acid | 100.00 wt % | 0.20 wt % | 0.20 wt % |
| Trilon M | 5.00 wt % | 0.04 wt % | 0.80 wt % |
| Water | — | — | 16.99 wt % |
| Metal Oxide Particle Dispersion 1 TiO$_2$ Dispersion Solids; 220 nm | 51.30 wt % | 30.00 wt % | 58.48 wt % |
| Total | | | 100.00 wt % |

Note
Some of the ingredients used in Tables 1-5 contain 100% of active components while others may contain less than 100% (See Actives column). Thus, ingredient percent in Formulation (wt %) = Target(wt %%)/Active(wt %).

Example 7

Metal Oxide and Latex Ink (Ink 1)

A thermal inkjet ink formulation with titanium dioxide and latex particles was prepared that was targeted for 5 wt % of latex solids and 25 wt % of metal oxide solids, as set forth in Table 2, below:

TABLE 2

| Components | Actives | Target | Formulation |
|---|---|---|---|
| 2-methyl-1,3-propanediol | 100.00 wt % | 5.00 wt % | 5.00 wt % |
| 2-Pyrrolidinone | 100.00 wt % | 16.00 wt % | 16.00 wt % |
| Nonionic Surfactant 1 | 90.00 wt % | 0.50 wt % | 0.56 wt % |
| Nonionic Surfactant 2 | 25.30 wt % | 0.50 wt % | 1.98 wt % |
| Crodafos N-3 Acid | 100.00 wt % | 0.20 wt % | 0.20 wt % |
| Trilon M | 5.00 wt % | 0.04 wt % | 0.80 wt % |
| Water | — | — | 10.40 wt % |
| Latex Dispersion 1 Sty-Acr Latex Solids; Tg 80° C.; 240 nm | 30.60 wt % | 5.00 wt % | 16.34 wt % |
| Metal Oxide Particle Dispersion 1 TiO$_2$ Dispersion Solids; 220 nm | 51.30 wt % | 25.00 wt % | 48.73 wt % |
| Total | | | 100.00 wt % |

Example 8

Metal Oxide and Latex Ink (Ink 2)

A thermal inkjet ink formulation with titanium dioxide and latex particles was prepared that was targeted for 12.5 wt % of latex solids and 15 wt % of metal oxide solids, as set forth in Table 3, below:

TABLE 3

| Components | Actives | Target | Formulation |
| --- | --- | --- | --- |
| 2-methyl-1,3-propanediol | 100% | 5.00% | 5% |
| 2-Pyrrolidinone | 100 | 16.0% | 16.0% |
| Nonionic Surfactant 1 | 90.00 wt % | 0.50 wt % | 0.56 wt % |
| Nonionic Surfactant 2 | 25.30 wt % | 0.50 wt % | 1.98 wt % |
| Crodafos N-3 Acid | 100.00 wt % | 0.20 wt % | 0.20 wt % |
| Trilon M | 5.00 wt % | 0.04 wt % | 0.80 wt % |
| Water | — | — | 3.8% |
| Latex Dispersion 1 Sty-Acr Latex Solids; Tg 80° C.; 240 nm | 30.60 wt % | 12.5% | 40.85% |
| Metal Oxide Particle Dispersion 2 $TiO_2$ Dispersion Solids; 240 nm | 47.50 wt % | 15.00 wt % | 31.58% |
| Total | | | 100.00 wt % |

Example 9

Metal Oxide and Latex Ink (Ink 3)

A thermal inkjet ink formulation with titanium dioxide and latex particles was prepared that was targeted for 10 wt % of latex solids and 20 wt % of metal oxide solids, as set forth in Table 4, below:

TABLE 4

| Components | Actives | Target | Formulation |
| --- | --- | --- | --- |
| 2-methyl-1,3-propanediol | 100.00 wt % | 5.00 wt % | 5.00 wt % |
| 2-Pyrrolidinone | 100.00 wt % | 16.00 wt % | 16.00 wt % |
| Nonionic Surfactant 1 | 90.00 wt % | 0.50 wt % | 0.56 wt % |
| Nonionic Surfactant 2 | 25.30 wt % | 0.50 wt % | 1.98 wt % |
| Crodafos N-3 Acid | 100.00 wt % | 0.20 wt % | 0.20 wt % |
| Trilon M | 5.00 wt % | 0.04 wt % | 0.80 wt % |
| Water | — | — | 4.56 wt % |
| Latex Dispersion 1 Sty-Acr Latex Solids; Tg 80° C.; 240 nm | 30.60 wt % | 10 wt % | 32.68 wt % |
| Metal Oxide Particle Dispersion 1 $TiO_2$ Dispersion Solids; 220 nm | 51.30 wt % | 20.00 wt % | 38.99 wt % |
| Total | | | 100.00 wt % |

Example 10

Metal Oxide and Latex Ink (Ink 4)

A thermal inkjet ink formulation with titanium dioxide and latex particles was prepared that was targeted for 12 wt % of latex solids and 24 wt % of metal oxide solids, as set forth in Table 5, below:

TABLE 5

| Components | Actives | Target | Formulation |
| --- | --- | --- | --- |
| 2-methyl-1,3-propanediol | 100.00 wt % | 5.00 wt % | 5.00 wt % |
| 2-Pyrrolidinone | 100.00 wt % | 16.00 wt % | 16.00 wt % |
| Nonionic Surfactant 1 | 90.00 wt % | 0.50 wt % | 0.56 wt % |
| Nonionic Surfactant 2 | 25.30 wt % | 0.50 wt % | 1.98 wt % |
| Crodafos N-3 Acid | 100.00 wt % | 0.20 wt % | 0.20 wt % |
| Trilon M | 5.00 wt % | 0.04 wt % | 0.80 wt % |
| Water | — | — | 0.46 wt % |
| Latex Dispersion 2 Sty-Acr Latex Solids; Tg 80° C.; 220 nm | 41.40 wt % | 12 wt % | 28.99 wt % |
| Metal Oxide Particle Dispersion 1 $TiO_2$ Dispersion Solids; 220 nm | 51.30 wt % | 24.00 wt % | 46.78 wt % |
| Total | | | 100.00 wt % |

Example 11

Comparative Data

Three white inkjet ink formulations (Control Ink, Ink 1, and Ink 2) were filled into both chambers of an HP Black/Yellow Ink Cartridge 940 and printed from an HP Office Jet Pro 8000 printer. The print media used was HP Inkjet Transparency. The White prints produced were dried (in the case of Control Ink) or fused (Ink 1 and Ink2) by using a heat gun at a temperature just greater than about 100-120° C. (up to about 20-30 seconds of heat exposure).

Figure 5:
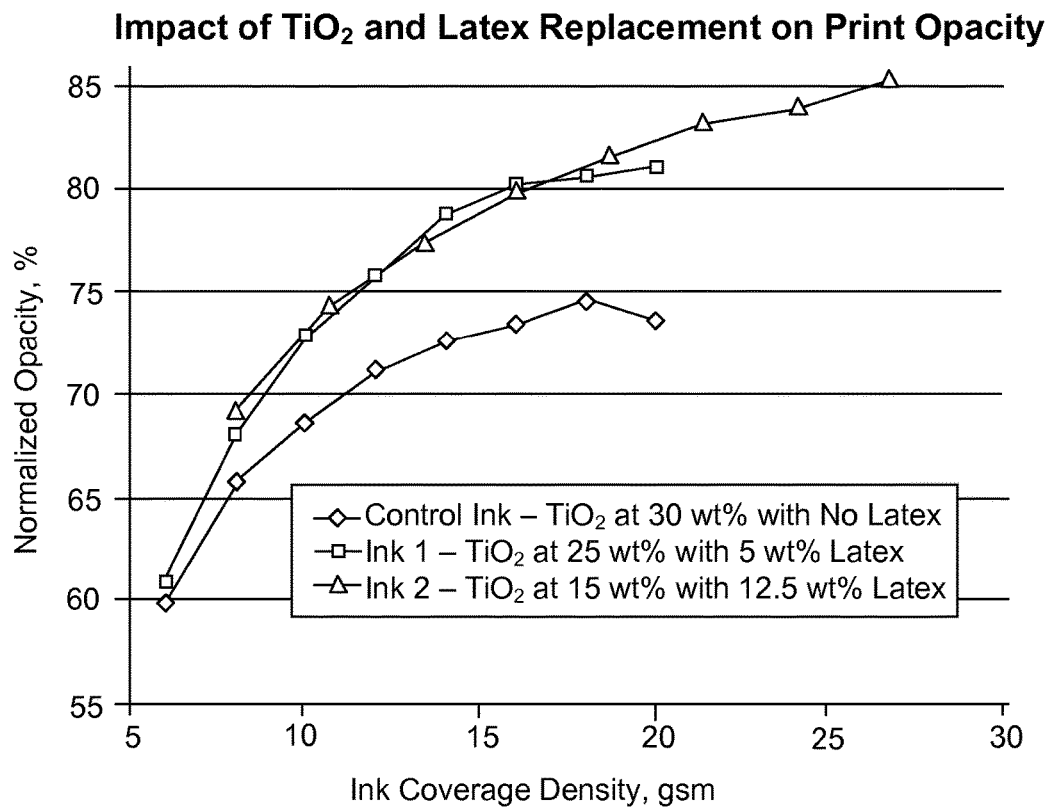
FIG. 5 is a graph depicting the impact of latex on print opacity in accordance with examples of the present disclosure.

Opacity of the white prints produced this way was evaluated as a ratio of tristimulus Y values for the print superimposed onto top of standard black and white backgrounds (Leneta Form 2C cards were used as a background for opacity measurements). In turn, tristimulus Y values of the white prints were calculated from their L* values measured by a "Macbeth SpectroEye" spectrophotometer. Plots of the print opacity vs. ink coverage density were recorded, and the data is provided in FIG. 5. As can be seen, a significant improvement of print opacity was generated for the formulations where some of $TiO_2$ pigment was partially replaced by the fusible polymer latex.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A white ink, comprising:
   an aqueous ink vehicle;
   from 2 wt % to 50 wt % of colorant consisting essentially of metal oxide particles having an average particle size from 100 nm to 1000 nm; and
   from 2 wt % to 20 wt % of latex particles having a glass transition temperature from 0° C. to 130° C. and a minimum film forming temperature below the glass transition temperature,
   wherein the metal oxide particles and the latex particles are present in the white ink at a weight ratio of from 6:1 to 1:3.

2. The white ink of claim 1, wherein the metal oxide particles have a high refractive index of from 1.8 to 2.8, and the latex particles have a low refractive index of from 1.3 to 1.6.

3. The white ink of claim 1, wherein the white ink is a thermal inkjet ink.

4. The white ink of claim 1, wherein the metal oxide particles are colorless and water insoluble.

5. The white ink of claim 1, wherein the metal oxide particles include titanium dioxide particles, zinc oxide particles, zirconium oxide particles, or combinations thereof.

6. The white ink of claim 1, wherein the latex particles include polymerized monomers of vinyl monomers, vinyl ester monomers, acrylate monomers, methacrylate monomers, styrene monomers, ethylene, maleate esters, fumarate esters, itaconate esters, or mixtures thereof.

7. The white ink of claim 1, wherein the latex particles have a glass transition temperature from 40° C. to 130° C.

8. The white ink of claim 1, further comprising a reactive hydrophilic alkoxysilane dispersing agent.

9. The white ink of claim 1, formulated such that when printed and fused to form a fused image on a media substrate, fused latex particles provide an average optical spacing between metal oxide particles of from 20 nm to 2000 nm.

10. The white ink of claim 9, wherein the metal oxide particles have a particle size from 170 nm to 400 nm, the average optical spacing is from 150 nm to 300 nm, and the fused image has a normalized opacity from 45% to 95%.

11. The white ink of claim 1, wherein the white ink printed on a non-porous substrate at ink coating density of 30 gsm and heat fused at 10° C. above the minimum film formation temperature of the latex particles has an opacity improvement of at least 5% greater than a comparative ink printed and heated under the same conditions, wherein the comparative ink is devoid of the latex particles and replaced by the metal oxide particles.

12. The white ink of claim 1, further comprising a coalescing solvent.

13. The white ink of claim 1, wherein the latex particles have an average particle diameter from 200 nm to 300 nm.

14. The white ink of claim 1, wherein the latex particles have an average particle diameter from 220 nm to 230 nm.

15. The white ink of claim 1, wherein the latex particles include polymerized monomers of a copolymerizable surfactant, styrene, and butyl acrylate.

16. The white ink of claim 15, wherein the latex particles further include polymerized monomers of methyl methacrylate, methacrylic acid, trimethylcyclohexyl methacrylate, or a combination thereof.

17. A method of forming a white image, comprising:
inkjet printing a white ink onto a media substrate to form a white image, the white ink comprising an aqueous ink vehicle; colorant consisting essentially of metal oxide particles having an average particle size from 100 nm to 1000 nm and a high refractive index from 1.8 to 2.8; and latex particles having a glass transition temperature from 0° C. to 130° C., a minimum film forming temperature below the glass transition temperature, and a low refractive index from 1.3 to 1.6, wherein the metal oxide particles and latex particles are present in the white ink at weight ratio is from 6:1 to 1:3; and
heat fusing the white image on the media substrate at a temperature from 2° C. to 110° C. greater than the minimum film formation temperature of the latex particles in the white ink to form a continuous film with suspended metal oxide particles having an average optical spacing between metal oxide particles ranging from 20 nm to 2000 nm.

18. The method of claim 17, wherein the metal oxide particles are colorless water insoluble particles having a particle size from 100 nm to 400 nm, and the optical spacing provided by the latex particles is from 150 nm to 300 nm.

19. A printed article, comprising 5 gsm to 50 gsm of a fused image applied to at least a portion of media substrate, the fused image including metal oxide particles having an average particle size from 100 nm to 1000 nm and a high refractive index from 1.8 to 2.8 optically spaced at an average of from 20 to 2000 nm by a fused latex film having a low refractive index from 1.3 to 1.6 and a glass transition temperature from 0° C. to 130° C. and a minimum film forming temperature below the glass transition temperature, wherein the fused image has a normalized opacity from 45% to 95%.

20. The printed article of claim 19, wherein the metal oxide particles are titanium dioxide, the titanium oxide has a particle size from 100 nm to 400 nm, the titanium dioxide is optically spaced at from 50 nm to 300 nm, and wherein the fused image has a normalized opacity from 60% to 95%.

* * * * *